May 13, 1958  H. JUPNIK  2,834,689
INFRA RED TRANSMITTING MEDIUM AND METHOD OF MAKING SAME
Filed April 28, 1955

INVENTOR
HELEN JUPNIK
BY
Louis L. Gagnon
ATTORNEY

United States Patent Office 2,834,689
Patented May 13, 1958

2,834,689

INFRARED TRANSMITTING MEDIUM AND METHOD OF MAKING SAME

Helen Jupnik, Southbridge, Mass., assignor to American Optical Company, Southbridge, Mass., a voluntary association of Massachusetts Application April 28, 1955, Serial No. 504,634

17 Claims. (Cl. 117—33.3)

This invention relates to improved infrared transmitting media and particularly to improved coated articles having relatively high transmission characteristics in the infrared region of the spectrum, and to the method of making the same.

A principal object of the invention is to produce media characterized by very high transmission through a wide band in the infrared region of the spectrum.

A further important object of the invention is to provide means and method of coating arsenic trisulphide glass so as to improve its transmission for infrared radiations incident thereon which are of wave lengths between 1 and 11 microns.

A further important object is to provide low reflectance coatings for arsenic trisulphide glass which are so controlled as to index of refraction and optical thickness as to provide a reflectance minimum at a preselected wave length within the infrared region which will obtain for the glass a maximum transmission at said wave length of about 98% and while generally improving transmission for infrared radiations of wave lengths between 1 and 11 microns.

A further important object of the invention is to provide such a coating which will materially improve the infrared transmitting characteristics of arsenic trisulphide glass by lowering the reflectivity of said surfaces of the arsenic trisulphide glass and with a minimum amount of absorption in the visible and particularly the mentioned infrared region between 1 and 11 microns.

A further important object of the invention is to provide such a coating that will strongly adhere to the surface of the arsenic trisulphide glass, that will be resistant to abrasion, and that will not be readily dissolved or loosened by water.

A further important object is to provide means in the form of a thin bonding film which will cause thorium oxyfluoride and like layers to bond more strongly to arsenic trisulphide glass when formed on such glasses in such thicknesses as to lower their reflectance to said infrared radiations.

A further object is to provide means and method of forming such coated articles in a simple, efficient and economical manner.

Many other objects and advantages of the invention will become apparent to those skilled in the art from a reading of the following description and an inspection of the accompanying drawing. It is also to be understood that the description is not to be taken in a limiting sense but only as illustrative of how the invention may be practiced and that many changes may be made in the details of compositions, arrangement of layers and steps of the method shown and described without departing from the spirit of the invention as expressed in the accompanying claims.

Figure 3:
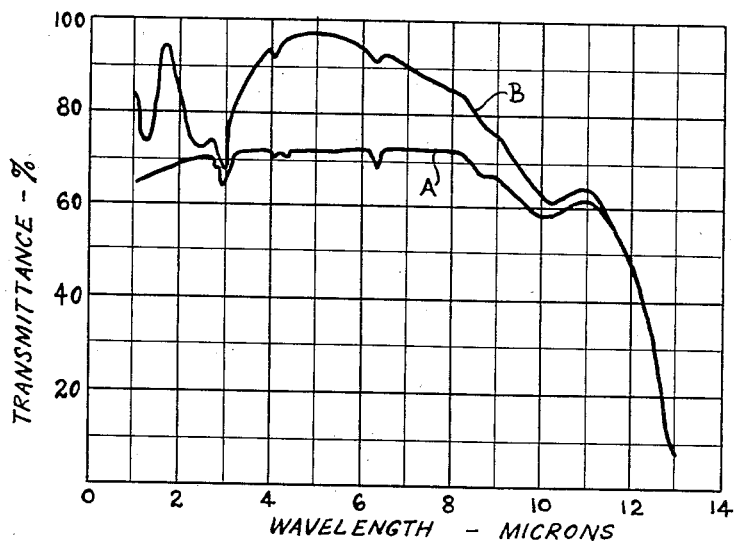
Figure 4:
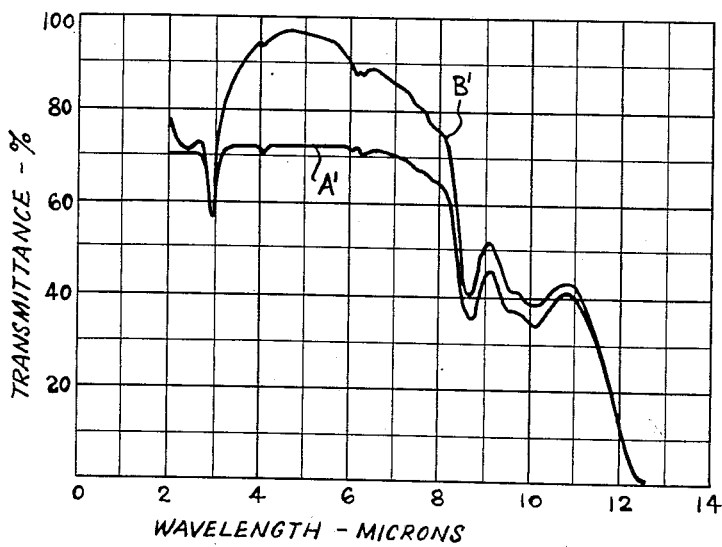

Fig. 3 graphically illustrates the transmission characteristics in the infrared region of the spectrum of an uncoated 2.55 mm. thick plate of arsenic trisulphide glass and of this plate when coated on both sides to produce a transmittance maximum in the neighborhood of 5 microns; and Fig. 4 graphically illustrates the transmission characteristics in the infrared region of the spectrum of an uncoated 4. mm. thick plate of arsenic trisulphide glass and of this plate when coated on both sides to produce a transmittance maximum also in the neighborhood of 5 microns.

Ordinary glasses such as the silicates tend to have relatively poor transmission characteristics for the near infrared radiations. On the contrary, a glass consisting of fused arsenic trisulphide ($As_2S_3$) hereinafter referred to as arsenic trisulphide glass as described, for example, in copending Lee Upton U. S. patent application Ser. No. 384,294 filed on October 5, 1953, now Patent 2,804,378, and assigned to the assignee of the present application will transmit relatively large amounts of such radiations.

Curve A in Fig. 3 which is representative of the transmission characteristics in the infrared region for arsenic trisulphide glass plates of 2.55 mm. thickness and curve A' in Fig. 4 which represents the transmission characterics of such plates when 4 mm. thick demonstrates that arsenic trisulphide glass, regardless of thickness, may be expected to transmit roughly 70 to 71% of the infrared radiations of wave lengths between 1 and 8 microns except for certain absorption bands which are most significant around 3 microns. However, for radiations longer than 8 microns, the thickness of the glass plates does have an important effect. For example curve A' in Fig. 4 shows that the transmission of a 4 mm. thickness of arsenic trisulphide glass falls off rather sharply beyond 8 microns averaging about 40% for radiations between 8.5 and 11 microns although because of selective absorptions in this region the curve is wavy. At 11 microns, the descent of the curve again becomes very steep and at about 12 microns or a little better the glass plate will have nearly complete absorption and negligible transmission. However, for a 2.55 mm. thick plate of the glass (cure A in Fig. 3) the transmission for radiations longer than 8 microns does start to drop off but less severely and the plate will still transmit roughly 60% of radiations, 11 microns long. From this point on, however, the absorption of the glass becomes acute and only negligible transmission of radiations longer than 13 microns is noted. The present invention is therefore directed to means and methods by which the transmission of arsenic trisulphide glass in said near infrared region between 1 and 8 microns where its transmission is substantially independent of thickness may be materially improved and so as to have nearly complete transmission at a selected narrower band between said limits.

One way to improve the transmission characteristics of such glasses would be by evaporating in vacuum a low reflectance coating on one or both of its surfaces. If the material of which the coating is formed is properly selected so as to have a low internal resistance to the said band of infrared radiations and to possess the proper index of refraction and optical thickness, experience teaches that marked improvement in the transmission characteristics of the coated glass over the uncoated glass should result.

Since arsenic trisulphide glass has an index of refraction in the vicinity of 2.4, it has been determined that coatings with substantially zero absorption having a refractive index between 1.4 and 1.72 would be particularly useful since such coatings could result in a peak transmittance of 98% or greater. Of the available materials, thorium oxyfluoride (ThOF$_2$) with an index of refraction of about 1.45 for visible light and silicon monoxide (SiO), the evaporation of which can be controlled to produce a film with an index of refraction of about 1.7, are preferred because of their low absorption for a wide band in the near infrared region. Silicon monoxide is effective for increasing transmittance in the near infrared region out, roughly, to 8 microns before the absorption of the coating becomes detrimental when conventional quarter wave length layers are deposited for these wave lengths. Thorium oxyfluoride applied as quarter wave length films will not introduce appreciable absorption out to wave lengths of about 11 microns.

However, unlike conventional silicate glasses, the melting point and coefficient of expansion of the arsenic trisulphide glass as well as other characteristics thereof are such that even thin layers of thorium oxyfluoride and silicon monoxide of the requisite thickness were not satisfactory since they adhered poorly to the arsenic trisulphide glass. The coatings were acceptable in the sense that they could withstand some amount of cleaning and handling but immersion in distilled water would generally soften the films or would cause them to peel off the substrate surface.

Repeated efforts following the experience gained in coating silicate glasses improved the coherence of the coating layers but were not successful in improving the adherence of the layers to any material extent. Very rapid evaporations of silicon monoxide, for example, greatly improved the resistance of the coating to abrasion and also resulted in coatings that were not peeled off the substrate by immersion in distilled water, but such rapid evaporations of silicon monoxide so altered the optical characteristics of the coatings as to produce maximum transmittances of the coated arsenic trisulphide more nearly in the neighborhood of 90% than of 98%. Very rapid evaporations of thorium oxyfluoride were not particularly helpful in improving the adherence of the film to the arsenic trisulphide substrate. Warming the arsenic trisulphide plate in vacuum, to the neighborhood of 70° C.–80° C., prior to depositing the film produced harder films of thorium oxyfluoride but was of little value in the case of silicon monoxide coatings. Increasing the temperature of the arsenic trisulphide plate to the neighborhood of 100° C. or higher increased the coherence and therefore the resistance to abrasion of both the silicon monoxide and thorium oxyfluoride coatings, but coatings deposited on such heated surfaces could be floated off the plate in a single sheet by placing the coated article in distilled water. Subjecting a surface of the arsenic trisulphide glass plate to a D. C. ionization discharge at low pressures before the film was evaporated requires careful control of the energy to relatively low values in order to avoid staining, etching or cracking of the article and does not improve the adherence of the coating. The same difficulties regarding adherence ensued whether the silicon monoxide or thorium oxyfluoride were evaporated from an electrically heated molybdenum or tantalum boat or by radiation from an electrically energized flat spiral filament mounted above the crucible containing the material. Baking the coating in vacuum and in air at different temperatures and time intervals did not solve the problem. Although baking in air is beneficial or harmless when the substrate is a silicate glass and proper coating techniques have been used, coatings could be floated off the arsenic trisulphide substrate by distilled water even though coated samples were heated in air at 100° C. for 12 hours, and heating the coated article to 150° C. in air would produce cracks in the coating. The difficulty increased as the thicknesses of the films were increased to provide minimum reflectance for longer wave lengths in the infrared region. Attempts to build up thicker coatings by evaporating thinner layers that would ordinarily not peel and allowing the sample to remain in air for several days before evaporation of a succeeding layer still did not produce satisfactory results. When treated with distilled water, portions of the film would show the same properties of peeling as if the entire film had been deposited continuously. Even evaporating thin films of arsenic trisulphide on arsenic trisulphide immediately before evaporating the silicon monoxide or thorium oxyfluoride without breaking vacuum did not help.

However, it was found that a coating much more resistant to the action of distilled water and still resulting in a transmittance in the neighborhood of 98% or better could be produced if a thin layer of a lead compound such as lead fluoride were first deposited on the arsenic trisulphide glass and then followed by a deposition of thorium oxyfluoride. This was found to be true despite the apparent solubility of lead fluoride in water. For example, a sample of arsenic trisulphide glass coated with lead fluoride was put into distilled water whereupon the coating became pinholed and gradually disappeared. There was, however, no flaking or peeling of the lead fluoride layer. Evaporating the layer of thorium oxyfluoride film over the lead fluoride apparently forms sufficient protection so that the water solubility of the underlayer of lead compound is not a deterrent factor. Instead, the composite coating appears to resist both dissolving and peeling in water even though bathed for long periods of time. Lead fluoride is particularly desirable as a binding film because of its low internal absorption both of visible and infrared light in the range of 1 to 11 microns with which the invention is particularly concerned.

Figure 1:
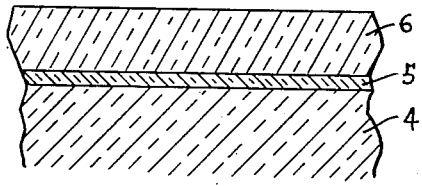
Fig. 1 illustrates in diagrammatic form an enlarged fragmentary sectional view of an infrared transmitting medium embodying a substrate of arsenic trisulphide glass having a bi-layer coating on a surface thereof for increasing its transmittance of infrared radiations.
Figure 2:
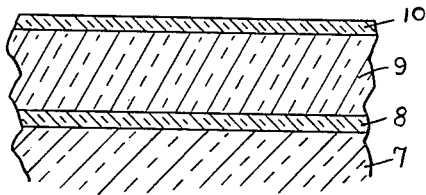
Fig. 2 illustrates in diagrammatic form a modification of the invention wherein the coating used to increase the infrared transmittance of arsenic trisulphide glass is tri-layered.

Different thickness of lead fluoride and thorium oxyfluoride can be selected in order to place the maximum transmittance at different specified wave lengths and to vary the value of the maximum transmittance in the infrared region. For example, a peak transmittance of about 98% can be attained in the neighborhood of 5 microns with an overall improvement in transmittance for infrared radiations in the band between 1 and 11 microns and better than 80% transmission for radiations in the band between 3 and 8 microns by first depositing a film of lead fluoride having an optical thickness of about one-eighteenth of the selected wave length on the arsenic trisulphide glass followed by a film of thorium oxyfluoride evaporated thereon to an optical thickness of seven thirty-sixths of the selected wave length. Such a coating is illustrated in Fig. 1 of applicant's drawing wherein reference numeral 4 represents the substrate of arsenic trisulphide glass. Both the lead floride layer 5 and the thorium oxyfluoride layer 6 were evaporated from molybdenum boats. For convenience and ease in carrying out the evaporation process, the deposition of the films are monitored in terms of visible light either by observing the change in interference colors on an adjacent plate of dense flint glass, for example, or by means of light transmitted or reflected by the article being coated, which light also passes through a filter to a detector such as a photocell. It is also convenient to monitor with a filter that passes wave lengths beyond the visible range and in the near infrared region.

Although it is preferred to place the lead fluoride or thorium oxyfluoride in a molybdenum or tantalum boat and electrically heat the boats sufficiently to obtain the evaporation of the lead fluoride or thorium oxyfluoride and their deposit on the surface of the arsenic trisulphide sample, other conventional methods of evaporation in vacuum may be employed such as the so-called radiation method wherein a flat spiral filament is mounted over the lead fluoride or thorium oxyfluoride contained in a suitable crucible. In this latter process, there, however, appears to be an opportunity for greater amounts of decomposition of the lead fluoride and so more careful control must be exercised. While the absorptivity of the films evaporated from the molybdenum boat was negligible for visible light and for infrared wave lengths, the films produced by the radiation method, in some instances, showed a higher absorptivity but the increase in absorption was not so great but that this method was also satisfactory.

No particular advantage was noted in allowing the arsenic trisulphide plates to cool to room temperature and remain in air for some time after the lead fluoride layer was applied and before the evaporation of the thorium oxyfluoride was attempted although heating the substrate prior to evaporation did provide some benefit. Immediately evaporating the thorium oxyfluoride after the evaporation of the lead fluoride layer without breaking vacuum obtained equally good results.

As compared with arsenic trisulphide glasses coated merely with a single layer of the thorium oxyfluoride, those samples where the oxyfluoride layer was evaporated on a previously deposited thin binding layer of lead fluoride were not visibly altered by prolonged soaking in water. For example, even after such samples had been soaked in distilled water for 24 hours, the coatings were not marred by being rubbed hard enough with cotton and alcohol or water to produce squealing and although the coatings could be gradually removed by continued polishing with cotton and levigated alumina dispersed in water, pieces of the coating were not torn or flaked off in the polishing process. Rather, it was a gradually wearing down.

A plate of arsenic trisulphide glass formed to a thickness of 2.55 millimeters and coated on both sides with a bilayer of lead fluoride plus thorium oxyfluoride, as discussed above, was found to have the transmission values in the infrared region, as indicated by B in Fig. 3 of applicant's drawing. Note the improvement in transmittance as compared with that of the uncoated arsenic trisulphide glass indicated by curve A in said Fig. 3. The maximum transmittance in the neighborhood of 5 microns was measured to be 97.5%. Characteristically, with this particular combination on an arsenic trisulphide plate, the transmittance remains 80% or greater in the wave length band 3.2 to 9 microns, provided that the arsenic trisulphide glass itself does not absorb in this band. Although this bilayer does not behave exactly like a single film in increasing the transmittance, in the neighborhood of the wave length for which the optical path through the bilayer is one half wave length the transmittance of the coated glass approaches that of the uncoated glass, and in the neighborhood of the wave length for which the optical path through the bilayer is about three quarter wave length, a second transmittance peak will occur. In the band between 4.25 and 6 microns the transmittance of the coated glass is 95% or greater. In regions where the glass is highly absorbing, the increase in transmittance of the glass is not as spectacular although a general raise and improved transmission may be said to be had for the band width between 1 and 11 microns. A similar improvement in transmission in this band width is also noted for the thicker piece of glass as illustrated by curves A' and B' in Fig. 4.

This improvement in transmittance takes place while at the same time a relatively durable coated article is maintained, that is, an article which is not only resistant to abrasion and the effects of handling but one which is also resistant to removal or destruction by water.

The transmittance values as shown in Figs. 3 and 4 were measured on a Perkin-Elmer Model 12C single beam spectrometer, the samples being in the form of plane parallel plates with polished surfaces and mounted in a holder placed in a convergent beam of radiation next to the rocksalt window at the entrance slit of the spectrometer.

Other lead-containing materials, such as lead chromate, lead sulphide and lead phosphate, have been found suitable as the binder film. However, the specific compounds mentioned appear to decompose somewhat more than the lead fluoride during evaporation of the material and consequently have greater absorption in the infrared region unless the thickness of the binder film is kept very thin with respect to infrared wave lengths. Although greater tendency of these latter materials to decompose when heated in a vacuum may lead to bilayered combinations with thorium oxyfluoride that have lower transmittance than when lead fluoride is used as the binder layer, nevertheless, they are very useful since the coated article does demonstrate substantial improvement over the uncoated arsenic trisulphide and, furthermore, the resultant coatings are rendered much more adherent and resistant to the action of water than are monolayers of thorium oxyfluoride and can only be polished off the arsenic trisulphide surface by using an abrasive powder such as mentioned above.

The lead fluoride, however, remains the preferred material. Since it has negligible decomposition during evaporation, greater flexibility may be had in the choice of its thickness. This is important since it permits one to produce optimum transmittance at different preselected wave lengths and it also enables one to produce a coating which more accurately reproduces the coefficient of expansion of the substrate.

It is not completely understood just why or how the lead-containing material functions to improve the adherence of the thorium oxyfluoride layer to the surface of the arsenic trisulphide glass. It is entirely possible that minor amounts of free lead released during the evaporation of the lead compound may play an important part in the bond. At any rate, it is apparent that the bond of thorium oxyfluoride layer to arsenic trisulphide glass is improved when the arsenic trisulphide glass surface is first covered with a relatively thin film of one of the mentioned lead-containing materials.

Preferably, the optical thickness of this lead-containing material is controlled to constitute a small fraction of the thickness of the thorium oxyfluoride layer, the thickness of the thorium oxyfluoride layer being proportionately reduced in thickness so that the overall thickness of the bilayer remains equal to a quarter of the selected wave length for which peak transmittance is desired or a little greater. The layer of lead-containing material may, it has been found, have an optical thickness up to about one half the optical thickness of the thorium oxyfluoride layer.

In the example illustrated by Fig. 1 and having the transmission characteristics as illustrated by the curves in Fig. 3, the optical thickness of the bilayer coating was controlled to be approximately 1.25 microns. The lead fluoride layer has an optical thickness of about 0.25 micron or a physical thickness of 0.156 micron. For transmittance maxima at longer wave lengths, the layers would, of course, have proportionately greater physical thicknesses. Thus, although the coatings are relatively thin as compared with the wave length of infrared radiations for which maximum transmittance is sought, they are, nevertheless, quite thick as compared with the usual low reflectance films which are deposited on silicate glasses to reduce reflectance or increase transmittance of radiations within the visible portion of the spectrum. The problems should be and, as pointed out, are, in fact, quite different.

Although the relatively thin layers of lead-containing material were not found to improve to any particular degree the adherence of layers of magnesium fluoride or silicon monoxide to arsenic trisulphide glass, it was found that, because of their high internal transmittance of the infrared radiations and their affinity for the thorium oxyfluoride layers, evaporation of thin films of these two materials, magnesium fluoride or silicon monoxide, over the thorium oxyfluoride layer would increase the resistance of the coated article both against abrasion and water.

For example, a film of lead fluoride 8 was evaporated onto a plate of arsenic trisulphide glass 7 and its optical thickness monitored to be about one half wave length of 500 millimicrons as in the previous example illustrated by Fig. 1. Over the lead fluoride layer 8 was evaporated a film 9 of thorium oxyfluoride, monitored to have an optical thickness of about 2.5 times said wave length. Then, a third film 10 of silicon monoxide was evaporated on the thorium oxyfluoride film 9. This final film 10 was monitored to have a thickness of about one half wave length. The coated article was then soaked in distilled water for 20 hours without any apparent effect on the coating. Part of the outer silicon monoxide layer 10 was then polished away. An additional 24-hour soaking in distilled water produced pinholes in the coating but it still adhered well enough so that an abrasive was required to completely polish it away. Further soaking of the sample in a 6% salt solution at 80° F. increased the number of pinholes but did not otherwise seem to soften the coating.

Although the above discussion refers to the layers 6 and 9 as comprising the material, thorium oxyfluoride, it is to be understood that the phrase is intended to include other thorium fluoride compounds since the commercially available material called thorium oxyfluoride is actually a mixture of thorium fluoride, thorium oxyfluoride and thorium oxide. It is also conceivable that hydrated thorium fluoride ($ThF_4 \cdot H_2O$) might be used. The phrase as used heretofore and throughout the specification and claims should, therefore, be taken as meaning any one of the above-mentiond thorium compounds or mixtures thereof.

From the foregoing description, it will be apparent that simple and efficient means and method have been provided for accomplishing all of the objects and advantages of the invention.

Having described my invention, I claim:

1. An infrared transmitting medium comprising arsenic trisulphide glass having a thin layer of thorium oxyfluoride bonded to said arsenic trisulphide glass by an intermediate layer of a lead compound selected from the group consisting of lead fluoride, lead chromate, lead sulphide and lead phosphate which is a fraction in thickness of the thorium oxyfluoride layer.

2. An infrared transmitting medium comprising arsenic trisulphide glass having a low reflectance coating on the surface thereof of an optical thickness equal to about one-quarter of a preselected wave length within the infrared radiation band, said coating comprising a layer of thorium oxyfluoride bonded to the surface of said arsenic trisulphide glass by a layer of a lead compound selected from the group consisting of lead fluoride, lead chromate, lead sulphide and lead phosphate which is a small fraction in thickness of the thorium oxyfluoride.

3. An infrared transmitting medium comprising arsenic trisulphide glass having a low reflectance coating on the surface thereof of an optical thickness equal to about one-quarter of a preselected wave length within the infrared radiation band, said coating comprising a layer of thorium oxyfluoride bonded to the surface of said arsenic trisulphide glass by a layer of a lead compound selected from the group consisting of lead fluoride, lead chromate, lead sulphide and lead phosphate which is a small fraction in thickness of the thorium oxyfluoride, and covered by a substantially equally thin layer of material from the group consisting of silicon monoxide and magnesium fluoride.

4. An infrared transmitting medium that is relatively resistant to abrasion and the effects of water comprising arsenic trisulphide glass having a thin layer of thorium oxyfluoride bonded to said arsenic trisulphide glass by an intermediate layer of lead fluoride which has a fractional thickness of the thorium oxyfluoride layer.

5. An infrared transmitting medium that is relatively insoluble in water and resistant to abrasion comprising arsenic trisulphide glass having a thin layer of thorium oxyfluoride bonded to said arsenic trisulphide glass by an intermediate layer of lead fluoride which is a fraction in thickness of the thorium oxyfluoride layer, and further being protected by an outer layer of silicon monoxide.

6. An infrared transmitting medium comprising arsenic trisulphide glass having a thin layer of thorium oxyfluoride bonded to said arsenic trisulphide glass by an intermediate layer of lead compound selected from the group consisting of lead fluoride, lead phosphate, lead chromate, lead sulfide and mixtures thereof.

7. An infrared transmitting medium comprising arsenic trisulphide glass having a thin layer of thorium oxyfluoride bonded to said arsenic trisulphide glass by an intermediate layer of lead compound selected from the group consisting of lead fluoride, lead phosphate, lead chromate, lead sulfide and mixtures thereof, and having an outer protective layer of material from the group consisting of silicon monoxide and magnesium fluoride overlying the thorium oxyfluoride.

8. An infrared transmitting medium characterized by its ability to transmit in the neighborhood of 98% of radiations of a preselected wave length in the band between 1 and 8 microns and comprising arsenic trisulphide glass coated with a thin film of thorium oxyfluoride, said thin film of thorium oxyfluoride being bonded to the surface of the arsenic trisulphide glass by an intermediate film of a layer of a lead compound selected from the group consisting of lead fluoride, lead chromate, lead sulphide and lead phosphate, the two films together representing an optical thickness equal to approximately a quarter wave length of said selected wave length within the infrared band between 1 and 8 microns.

9. An infrared transmitting medium comprising arsenic trisulphide glass coated with a thin film of thorium oxyfluoride so that its ability to transmit radiations of a wave length between 1 and 11 microns is substantially improved, said thin film of thorium oxyfluoride being bonded to the surface of the arsenic trisulphide glass by an intermediate film of a layer of a lead compound selected from the group consisting of lead fluoride, lead chromate, lead sulphide and lead phosphate, the two films together representing an optical thickness equal to approximately a quarter wave length of a selected wave length within the said infrared band between 1 and 11 microns.

10. An infrared transmitting medium characterized by its ability to transmit in the neighborhood of 98% of a preselected radiation in the infrared band of wave lengths between 1 and 11 microns and comprising arsenic trisulphide glass coated with a thin film of thorium oxyfluoride, said thin film of thorium oxyfluoride being bonded to the arsenic trisulphide glass by an intermediate film of a layer of a lead compound selected from the group consisting of lead fluoride, lead chromate, lead sulphide and lead phosphate, the two films together having an optical thickness equal to approximately a quarter of the wave length of said preselected radiation.

11. An infrared transmitting medium characterized by its ability to transmit 80% or better of radiations of a length between 3.2 and 9 microns and comprising arsenic trisulphide glass coated with successive thin films of lead fluoride, thorium oxyfluoride and silicon monoxide.

12. An infrared transmitting medium characterized by its ability to transmit 80% or better of radiations of a length roughly between 3.2 and 9 microns and comprising arsenic trisulphide glass coated with successive thin films of lead fluoride, thorium oxyfluoride and magnesium fluoride.

13. An infrared transmitting medium characterized by its relatively high transmission throughout a band width of wave length between 3 and 8 microns comprising an arsenic trisulphide substrate coated with a first film of a layer of a lead compound selected from the group consisting of lead fluoride, lead chromate, lead sulphide and lead phosphate, monitored to have an optical thickness equal to one-half wave length of 500 millimicrons, and an overlying layer of thorium compound monitored to have an optical thickness equal to twice said wave length of 500 millimicrons, said resultant coating being resistant to abrasion and water.

14. An infrared transmitting medium characterized by its relatively high transmission throughout a band width of wave lengths between 3 and 8 microns comprising an arsenic trisulphide substrate coated with a first film of a layer of a lead compound selected from the group consisting of lead fluoride, lead chromate, lead sulphide and lead phosphate, montitored to have an optical thickness equal to one-half a wave length of 500 millimicrons, a second layer of thorium compound monitored to have an optical thickness equal to two and a half said wave lengths of 500 millimicrons, and an outer protective layer of material from the group consisting of silicon monoxide and magnesium fluoride monitored to have an optical thickness equal to one-half said wave length of 500 millimicrons, said resultant coating being relatively resistant to abrasion and the effects of water.

15. An infrared transmitting medium characterized by its ability to transmit greater than 80% of radiations having wave lengths between roughly 3 and 8 microns, and with a peak transmission of 98% for radiations having a wave length in the neighborhood of 5 microns, said medium comprising arsenic trisulphide glass coated on both surfaces with a bilayer embodying a glass-surface-contacting layer of lead fluoride having an optical thickness of about one-half wave length at 500 millimicrons and an over layer of thorium oxyfluoride having an optical thickness of about 2 wave lengths of said 500 millimicrons, said layer of lead fluoride strongly bonding the thorium oxyfluoride layer to the arsenic trisulphide glass and the coating being strongly resistant to abrasion and not readily lifted by water.

16. The method of improving the infrared transmitting characteristics of arsenic trisulphide glass comprising the steps of initially coating the surfaces thereof with a thin film of a layer of a lead compound selected from the group consisting of lead fluoride, lead chromate, lead sulphide and lead phosphate, applying a layer of thorium oxyfluoride over said lead-containing material, and controlling the thicknesses of said films so as to have a total thickness equal to approximately a quarter wave length of a selected radiation within the infrared region of the spectrum.

17. The method of improving the bond of a thin layer of thorium oxyfluoride to arsenic trisulphide glass comprising the step of first evaporating onto the surface of the arsenic trisulphide glass to be subsequently coated by the layer of thorium oxyfluoride a layer of a lead compound selected from the group consisting of lead fluoride, lead chromate, lead sulphide and lead phosphate to an optical thickness representing a small fraction of the thickness of said thorium oxyfluoride layer.

References Cited in the file of this patent

UNITED STATES PATENTS

| | | |
|---|---|---|
| 2,624,238 | Widdop et al. | Jan. 6, 1953 |
| 2,668,478 | Schroder | Feb. 9, 1954 |
| 2,675,740 | Barkley | Apr. 20, 1954 |